(12) United States Patent
Yang et al.

(10) Patent No.: US 12,285,689 B2
(45) Date of Patent: Apr. 29, 2025

(54) CONTEXT-AWARE MODEL GENERATING METHOD AND IMPORTANT EVENT DETERMINING METHOD IN E-SPORTS GAME, AND IN-GAME CONTEXT MANAGEMENT SERVER PERFORMING THE SAME METHODS

(71) Applicant: Electronics and Telecommunications Research Institute, Daejeon (KR)

(72) Inventors: Seong Il Yang, Daejeon (KR); Sang Kwang Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 255 days.

(21) Appl. No.: 17/983,491

(22) Filed: Nov. 9, 2022

(65) Prior Publication Data

US 2023/0233945 A1   Jul. 27, 2023

(30) Foreign Application Priority Data

Jan. 26, 2022 (KR) .................... 10-2022-0011368

(51) Int. Cl.
*A63F 13/69* (2014.01)
*A63F 13/23* (2014.01)
*A63F 13/35* (2014.01)

(52) U.S. Cl.
CPC ............. *A63F 13/69* (2014.09); *A63F 13/23* (2014.09); *A63F 13/35* (2014.09)

(58) Field of Classification Search
CPC .......... A63F 13/69; A63F 13/23; A63F 13/35; A63F 13/215; A63F 13/86; G06V 20/44; G10L 15/02
See application file for complete search history.

(56) References Cited

U.S. PATENT DOCUMENTS

| | | | |
|---|---|---|---|
| 2008/0138029 | A1 | 6/2008 | Xu et al. |
| 2013/0225305 | A1 | 8/2013 | Yang et al. |
| 2017/0257568 | A1 | 9/2017 | Kim et al. |
| 2019/0262705 | A1 | 8/2019 | Trombetta et al. |

(Continued)

FOREIGN PATENT DOCUMENTS

| | | |
|---|---|---|
| JP | 63-056698 | 3/1988 |
| KR | 10-2017-0107287 | 9/2017 |
| KR | 10-2019-0074131 | 6/2019 |

*Primary Examiner* — Peter J Iannuzzi
(74) *Attorney, Agent, or Firm* — KILE PARK REED & HOUTTEMAN PLLC

(57) ABSTRACT

Provided are a context-aware model generating method, an important event determining method, and an in-game context management server for performing the same methods. The context-aware model generating method includes generating a context-aware model which determines whether an important event of a video game occurs by using in-game data, utterance data, and chat data collected from the video game capable of being broadcasted as a sports game video. The important event determining method includes combining candidate events predictable from each of the in-game data, the utterance data, and the chat data based on the context-aware model, and determining, as an important event, a candidate event including a duplicate game content among candidate events.

19 Claims, 4 Drawing Sheets

(56) References Cited

U.S. PATENT DOCUMENTS

| | | |
|---|---|---|
| 2019/0270018 A1 | 9/2019 | Evans et al. |
| 2020/0169793 A1 | 5/2020 | Akerfeldt |
| 2021/0170281 A1 | 6/2021 | Marr et al. |
| 2023/0149819 A1* | 5/2023 | Pandhare .............. H04L 65/612 709/217 |

* cited by examiner

CONTEXT-AWARE MODEL GENERATING METHOD AND IMPORTANT EVENT DETERMINING METHOD IN E-SPORTS GAME, AND IN-GAME CONTEXT MANAGEMENT SERVER PERFORMING THE SAME METHODS

CROSS-REFERENCE TO RELATED APPLICATION

This application claims the benefit of Korean Patent Application No. 10-2022-0011368 filed on Jan. 26, 2022, in the Korean Intellectual Property Office, the entire disclosure of which is incorporated herein by reference for all purposes.

BACKGROUND

1. Field of the Invention

One or more example embodiments relate to a context-aware model generating method, an important event determining method, and an in-game context management server, and more particularly, to a method of automatically recognizing an important event occurring in a game content by using multiple signals generated in a process of broadcasting an electronic sports (e-sports) game.

2. Description of the Related Art

Recently, along with the introduction of machine learning methodologies such as deep learning, methods of recognizing or classifying target output values or occurrence of events using various types of data, such as sensor data, image/voice signals, text data, and the like are suggested. Particularly, the representative fields of the above methods are object recognition based on image signals, voice/language recognition targeting voice signals, and the like.

However, in case of a service in which complex signals are generated together, such as a game content, it is necessary to simultaneously utilize the contextual attributes of a recognition target. Particularly, for the most important in-game contextual information, a replay file or a necessary event that occurs in the game is recorded as log data. In this case, when the game content is broadcasted to the public, as a case of the e-sports game, the amount of generated data further increases, which requires a service technology for utilizing the data.

SUMMARY

Example embodiments provide a context-aware model generating method of generating a context-aware model for determining an important event by performing machine learning on in-game data, game video data, and relay server data specialized for an electronic sports (e-sports) game.

Example embodiments provide an important event determining method of determining an occurrence time point of an important event associated with highlights or factors of outcome of the e-sports game in association with a context-aware model.

According to an aspect, there is provided a context-aware model generating method performed by an in-game context management server, the context-aware model generating method including determining in-game situation information on a game content by collecting in-game data, configured to be replayed, in a video game; determining voice utterance information by collecting game video data recorded in a process of broadcasting the video game as a sports game video, determining relay situation information by collecting relay server data of viewers who have accessed the in-game context management server, and generating a context-aware model which determines whether an important event occurs by using at least one of the in-game situation information, the voice utterance information, or the relay situation information.

The determining of the in-game situation information may include extracting in-game situation information on a specific action of a player by analyzing the in-game data and game video data for the video game, determining an in-game situation attribute for a game content by analyzing the in-game situation information, and determining the in-game situation information configured to be replayed, by applying the in-game situation attribute to an in-game event recognition model.

The extracting of the in-game situation information may include extracting the in-game situation information on the specific action of the player occurring at a certain time, based on a game content in which an input manipulation of the player is reflected in a process of the video game.

The determining of the voice utterance information may include extracting a voice signal of a commentator who provides a running commentary of the sports game video by analyzing the game video data, extracting a voice signal of a viewer who is watching the sports game video by analyzing the game video data, and determining the voice utterance information by applying the voice signal of the commentator and the voice signal of the viewer to an utterance event recognition model.

The extracting of the voice signal of the commentator may include determining game video data collected by a microphone connected to a relay broadcast camera based on the sports game video, classifying voice utterance attributes of each of a plurality of audible frequencies from the game video data, and extracting the voice signal of the commentator based on each of the classified voice utterance attributes.

The determining of the relay situation information may include extracting identification information on the viewers who have accessed the in-game context management server in a process of broadcasting the video game by analyzing the relay server data, and determining the relay situation information on access by applying the identification information on the viewers to an utterance event recognition model.

The determining of the relay situation information may include determining a spectator participation attribute for a service operation of broadcasting the sports game video based on the identification information on the viewers, and determining the relay situation information based on a message, by applying the spectator participation attribute to the utterance event recognition model.

The generating of the context-aware model may include determining candidate events in consideration of characteristics represented by each of the in-game situation information, the voice utterance information, and the relay situation information, and generating the context-aware model which determines a candidate event including a duplicate game content among the candidate events as a final important event.

According to another aspect, there is provided an important event determining method performed by an in-game context management server, the important event determining method including determining a first candidate event associated with a game content by using in-game record observation data associated with a video game which is being broadcasted as a sports game video, determining a second candidate event associated with a voice signal by using game video observation data recorded in a process of broadcasting the video game as the sports game video, determining a third candidate event associated with a chat situation by using relay server record observation data of viewers who have accessed an in-game context management server, and determining an important event of the video game by applying at least one of the first candidate event, the second candidate event, or the third candidate event to a context-aware model.

The context-aware model may be a model which is generated to determine whether an important event configured to be replayed occurs in the video game, by using at least one of the in-game record observation data, the game video observation data, or the relay server record observation data.

The determining of the first candidate event may include determining an in-game situation attribute for a game content by analyzing the in-game record observation data, and determining the first candidate event configured to be replayed in the game content according to the in-game situation attribute by an in-game event recognition model.

The determining of the second candidate event may include extracting a voice signal of a commentator and a voice signal of a viewer from the game video observation data recorded at the same time in the process of broadcasting the video game as the sports game video, determining voice utterance information configured to be replayed in the sports game video according to the voice signal of the commentator and the voice signal of the viewer, and determining a second candidate event based on the voice utterance information by an utterance event recognition model.

The extracting of the voice signals may include extracting the voice signal of the commentator and the voice signal of the viewer by classifying voice utterance attributes of each of a plurality of audible frequencies from the game video observation data.

The determining of the third candidate event may include extracting identification information on viewers who have accessed the in-game context management server in the process of broadcasting the video game based on the relay server record observation data, and determining the third candidate event based on the identification information on the viewers by an utterance event recognition model.

The determining of the third candidate event may include determining a spectator participation attribute associated with a service operation of broadcasting the sports game video based on the identification information on the viewers, and determining the third candidate event based on the spectator participation attribute by the utterance event recognition model.

The determining of the important event may include applying at least one of the first candidate event, the second candidate event, or the third candidate event to the context-aware model, and determining a candidate event including a duplicate game content among the candidate events as an important event by the context-aware model.

According to still another aspect, there is provided an in-game context management server including a processor. The processor may generate a context-aware model which determines whether an important event configured to be replayed occurs in a video game which is being broadcasted as a sports game video, determine candidate events from in-game context information, voice utterance information, and relay situation information associated with the video game by the context-aware model, and determine a candidate event including a duplicate game content among the candidate events as an important event.

The processor may determine the in-game situation information on a game content by collecting in-game data configured to be replayed in the video game, determine the voice utterance information by collecting utterance data recorded in a process of broadcasting the video game as the sports game video, determine the relay situation information by collecting chat data of viewers who have accessed the in-game context management server, and generate the context-aware model which determines whether the important event occurs by using at least one of the in-game situation information, the voice utterance information, or the relay situation information.

The processor may determine a first candidate event according to the game content by using in-game data for the video game which is being broadcasted as the sports game video, determine a second candidate event according to voice utterance information using utterance data recorded in a process of broadcasting the video game as the sports game video, and determine a third candidate event according to the relay situation information by using chat data of viewers who have accessed the in-game context management server.

The processor may determine, as an important event, a candidate event including a duplicate game content among the candidate events by applying at least one of the first candidate event, the second candidate event, or the third candidate event to the context-aware model.

Additional aspects of example embodiments will be set forth in part in the description which follows and, in part, will be apparent from the description, or may be learned by practice of the disclosure.

According to example embodiments, the context-aware model generating method may increase accuracy regarding whether the important event occurs by generating the context-aware model which utilizes an index obtained by standardizing all reactions of commentators, who watch and analyze the e-sports game, and spectators in each situation, not only in general situations in the e-sports game.

According to example embodiments, the important event determining method may determine an occurrence time point of an important event associated with highlights or factors of outcome of the e-sports game in association with the context-aware model.

According to example embodiments, the important event determining method may relatively determine information on the commentators and the spectators in association with the context-aware model, thereby providing an important event having higher reliability from a viewpoint of commercialized service.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, example embodiments will be described in detail with reference to the accompanying drawings.

Figure 1:
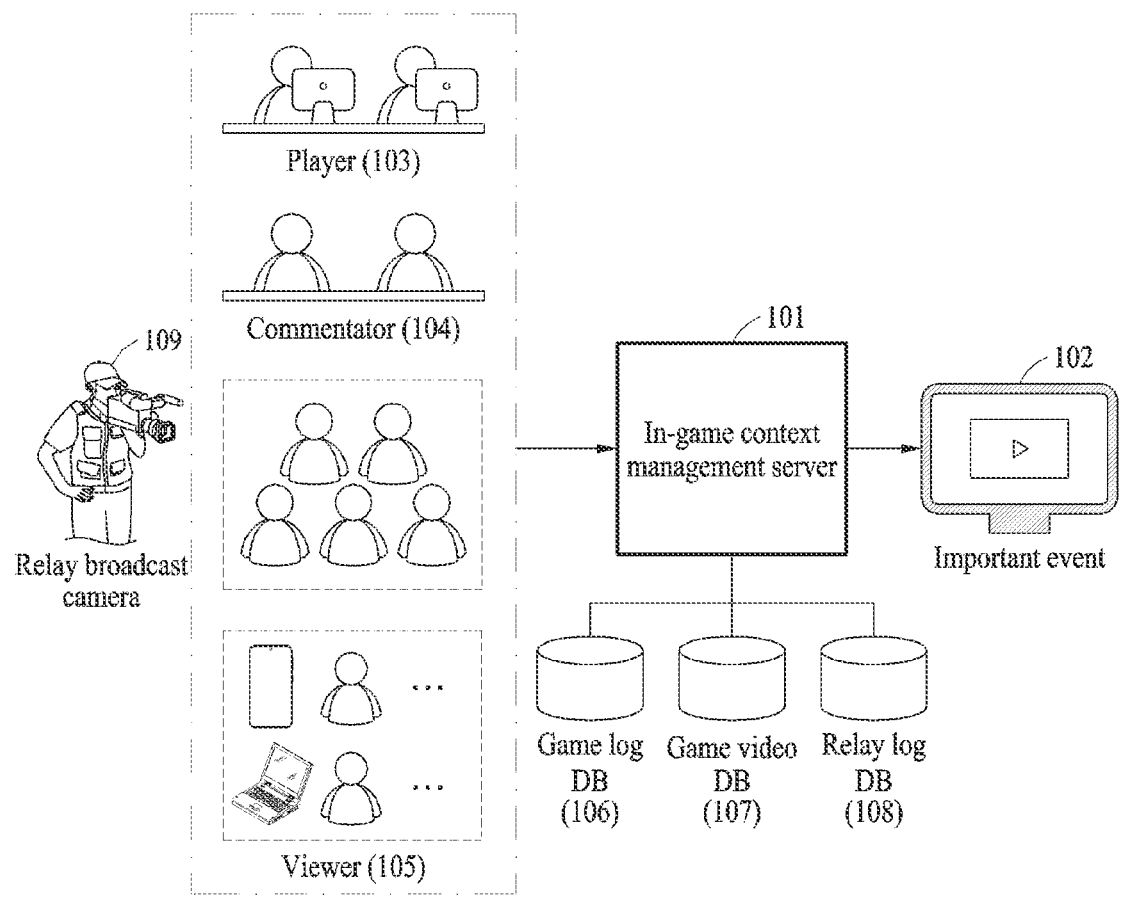
FIG. 1 is a diagram illustrating an overall operation for managing in-game situations according to an example embodiment.

FIG. 1 is a diagram illustrating an overall operation for managing in-game situations according to an example embodiment.

Referring to FIG. 1, it is very important for a content service such as a video game described herein to detect an important event occurring in an in-game situation. Accordingly, in case of e-sports, to which the technology of the disclosure is mainly applied, in analysis of factors of victory or defeat, the outcome of the game may be predicted by determining situations where the factors have been found, and a highlight video may be automatically extracted based on important events.

For this, an in-game context management server 101 may collect in-game data for replaying a video game and determine in-game context information on a game content. The in-game context management server 101 may analyze the in-game data and game video data for the video game and extract in-game context information on a specific action of a player 103. The in-game context management server 101 may collect the game video data recorded by a microphone connected to a relay broadcast camera 109 for broadcasting the video game as a sports game video to determine voice utterance information. The voice utterance information may be determined by a voice utterance attribute of each commentator 104 and spectator voice utterance properties of viewers 105.

The in-game context management server 101 may collect relay server data of viewers who have accessed the in-game context management server 101 to determine the relay situation information. The in-game context management server 101 may generate a context-aware model for determining whether an important event occurs by using at least one of the in-game context information, the voice utterance information, or the relay situation information.

In the example embodiment, there are structured data and unstructured data divided by attributes used to recognize a situation that may be replayed in a video game. The unstructured data may correspond to a voice signal and a language signal, and the voice signal and the language signal may be used to extract attributes of the structured data which may determine an intensity of occurrence of an important event using a frequency and intensity of the occurrence. The structured data may correspond to login data and a click signal, and the login data and click signal may measure a possibility of occurrence of an important event in the game through a total frequency of occurrence, the amount of change in a signal generated per unit time, and the like.

Accordingly, in the example embodiment, a complex and relative determination criterion may be used to determine whether an important event has occurred. Therefore, in the example embodiment, all pieces of situation data may be divided and classified by a time period by an automatic classification model of machine learning, and the occurrence of an important event may be determined for the classified data in which a relatively significant matter occurs among the pieces of data. That is, in the example embodiment, each of 1) an in-game event recognition model for in-game data, 2) an utterance event recognition model for game video data, and 3) a chat event recognition model for relay server data may be generated. In this case, the in-game event recognition model may be associated with a game log DB 106, the utterance event recognition model may be associated with a game video DB 107, and the chat event recognition model may be associated with a relay log DB 108.

In the example embodiment, candidate events recognized according to characteristics of data used in each of the in-game event recognition model, the utterance event recognition model, and the chat event recognition model may be extracted. The example embodiment may be configured to finally collect the candidate events extracted from each model and determine whether an important event 102 occurs. Therefore, in the example embodiment, videos or scenes associated with various game contents based on the occurrence of the important event 102 may be suggested, thereby easily receiving a content desired by a user.

Figure 2:
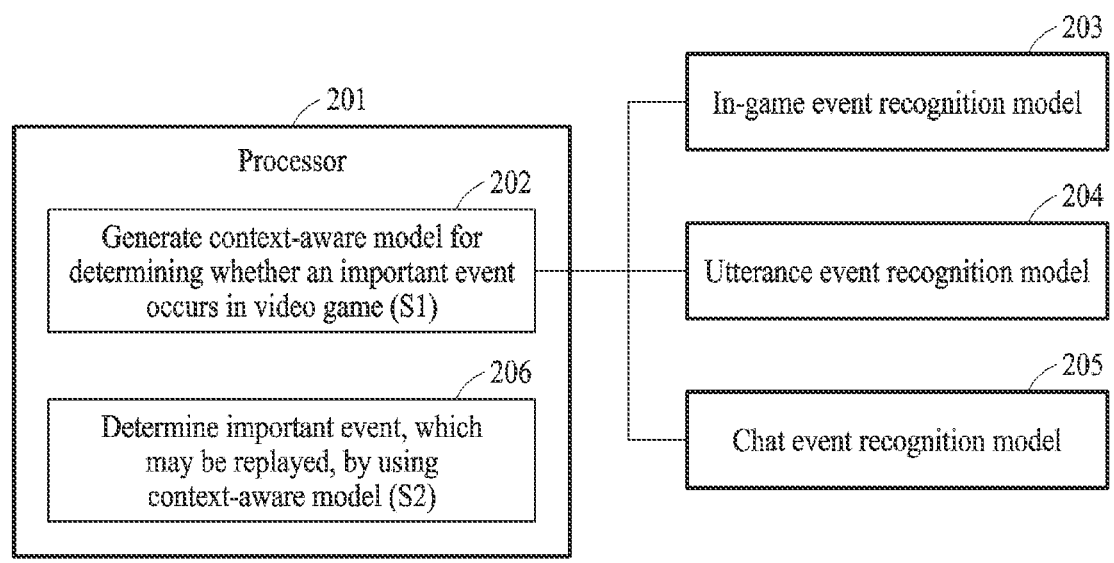
FIG. 2 is a diagram illustrating a detailed operation of an in-game context management server according to an example embodiment.

FIG. 2 is a diagram illustrating a detailed operation of an in-game context management server according to an example embodiment.

Referring to FIG. 2, the in-game context management server may include a processor 201, and the processor 201 may provide an important event having higher reliability, from a viewpoint of commercialized service that is broadly divided into two steps. The in-game context management server may perform a primary step of generating a context-aware model by using three types of data generated from a sports game video. The in-game context management server may perform a secondary step of finally determining whether an important event occurs in the sports game video in association with the context-aware model.

In operation S1 (202), when a sports game video is broadcasted, the processor 201 may generate each of models 203, 204, and 205 through machine learning for in-game data, game video data, and relay server data obtained by recording the progress in the video game in the form of replay. The processor 201 may generate a context-aware model capable of recognizing whether an important event within a sports game video has occurred at a current time point according to each of the models 203, 204, and 205.

In more detail, the processor 201 may collect in-game data which may be replayed, the in-game data including information for restoring the progress of the video game, and store and manage the in-game data in a game log DB. The processor 201 may extract in-game situation information based on the in-game data included in the game log DB, and receive in-game situation attributes clarified by the in-game situation information as training data. The processor 201 may generate the in-game event recognition model 203 by performing machine learning on input training data.

The processor 201 may collect game video data containing the sports game video and store and manage the game video data in the game video DB. The processor 201 may extract a voice signal of a commentator in the game video DB and extract a voice utterance attribute of each commentator clarified by the voice signal of the commentator. Also, the processor 201 may extract a voice signal of a viewer in the game video DB. The processor 201 may extract a spectator voice utterance attribute clarified by the voice signal of the viewer.

The processor 201 may receive, as training data, the voice utterance attribute of each commentator clarified by the voice signal and the spectator voice utterance attribute clarified by the voice signal of the viewer. The processor 201 may generate the utterance event recognition model 204 through machine learning performed on the input training data.

The processor 201 may collect relay server data for service operation of broadcasting a video associated with a sports game video, and store and manage the relay server data in the relay log DB. The processor 201 may extract a spectator participation attribute based on the relay server data included in the relay log DB. The processor 201 may extract a spectator access situation attribute clarified by the spectator participation attribute.

The processor 201 may extract a chat log from the relay log DB and receive, as training data, chat information such as a chat utterance attribute clarified by the chat log. The processor 201 may generate the chat event recognition model 205 through machine learning performed on the input training data.

Finally, the processor 201 may generate a context-aware model which finally calculates the occurrence of an important event by using, as the training data, three result values of the in-game event recognition model 203, the utterance event recognition model 204, and the chat event recognition model 205, respectively.

In operation S2 (206), the processor 201 may determine whether an important event, which may be replayed, occurs by using the context-aware model as a final object.

The processor 201 may extract the in-game situation information by using, as input data, in-game record observation data which is unit data for calculating a result. The processor 201 may calculate, as a median value, a result value of the in-game event recognition model 203 by using an in-game situation attribute clarified by the in-game situation information as input data.

The processor 201 may calculate voice signals of the commentators from game video observation data, which is unit data synchronized with the same time point. The processor 201 may extract the voice utterance attribute through the calculated voice signals of the commentators. For example, the processor 201 may extract a voice utterance attribute of a commentator 1 and a voice utterance attribute of a commentator 2 which are clarified by the voice signals of the commentators.

The processor 201 may extract a voice signal of a viewer from the game video observation data and extract an audio voice utterance attribute clarified by the extracted voice signal of the viewer. The processor 201 may calculate, as a median value, a result value of the utterance event recognition model 204 by using the voice utterance attribute of the commentator and the spectator voice utterance attribute of the viewer as input data.

The processor 201 may extract a spectator participation attribute from relay server record observation data which is unit data synchronized with the same time point. The processor 201 may extract a spectator access situation attribute clarified by the spectator participation attribute. The processor 201 may extract a chat log from the relay server record observation data and receive the chat utterance attribute clarified by the chat log as input data.

The processor 201 may calculate, as a median value, a result value of the chat event recognition model 205 according to the received input data.

The processor 201 may determine whether an important event occurs by the context-aware model by using the three result values described above as final input data.

Figure 3:
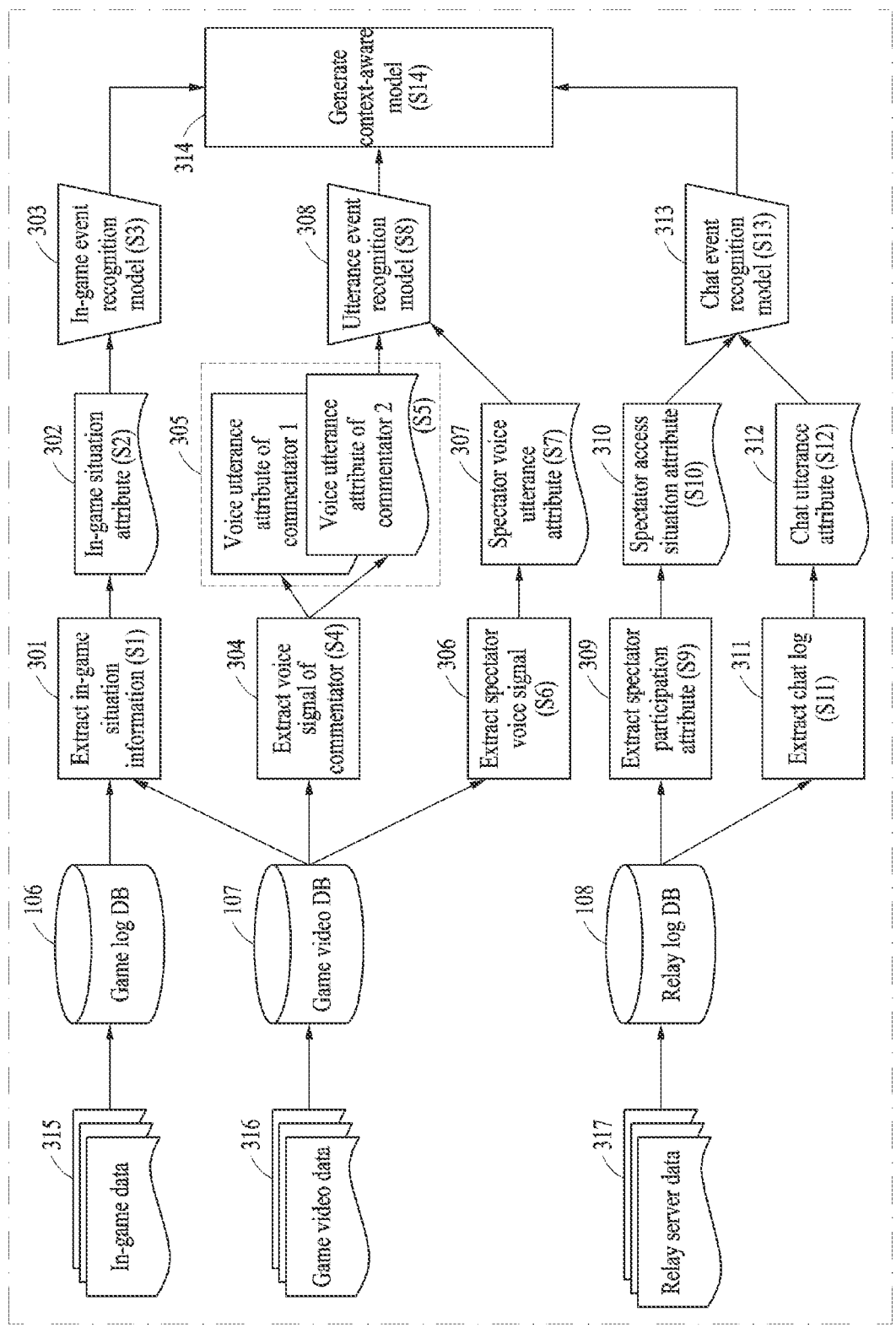
FIG. 3 is a flowchart illustrating a context-aware model generating method according to an example embodiment.

FIG. 3 is a flowchart illustrating a context-aware model generating method according to an example embodiment.

In operation S1 (301), the in-game context management server may collect in-game data 315 of a video game, which may be replayed, and store and manage the in-game data 315 in the game log DB 106. The in-game context management server may extract the in-game data 315 in association with the game log DB 106 and determine in-game situation information on a game content based on the in-game data 315. The in-game context management server may analyze the in-game data and game video data for a video game to extract the in-game situation information on a specific action of a player. The in-game context management server may extract the in-game situation information on the specific action of the player that occurs at a certain time based on a game content, in which an input manipulation of the player is reflected in a process of a video game.

In operation S2 (302), the in-game context management server may determine the in-game situation attribute for the game content by analyzing the in-game situation information.

In operation S3 (303), the in-game context management server may generate an in-game event recognition model based on the in-game situation attribute. The in-game event recognition model may be a model which receives the in-game situation attribute as the training data and provide a first candidate event automatically through the machine learning.

In operation S4 (304), the in-game context management server may collect game video data 316 recorded in a process of broadcasting the video game as the sports game video, and store and manage the game video data 316 in the game video DB 107. Herein, the in-game context management server may collect the game video data collected by a microphone connected to a relay broadcast camera based on the sports game video. The in-game context management server may extract the game video data 316 in association with the game video DB 107 and extract the voice signal of the commentator who provides a running commentary of the sports game video.

In operation S5 (305), the in-game context management server may classify the voice signals of the commentators to determine the voice utterance attributes of the commentators for each of a plurality of audible frequencies.

In operation S6 (306), the in-game context management server may analyze the game video data to extract a voice signal of a viewer who is watching the sports game video.

In operation S7 (307), the in-game context management server may determine the voice utterance attribute of the viewer according to an audible frequency from the voice signal of the viewer.

In operation S8 (308), the in-game context management server may generate the utterance event recognition model based on the in-game situation attribute. The utterance event recognition model herein may be a model which receives, as training data, the voice utterance attributes of the commentators and the voice utterance attributes of the viewers, and provides a second candidate event automatically through the machine learning.

In operation S9 (309), the in-game context management server may collect relay server data 317 of viewers who have accessed the in-game context management server, and store and manage the relay server data 317 in the relay log DB 108. The in-game context management server may extract the relay server data 317 in association with the relay log DB 108. The in-game context management server may extract, from the relay server data 317, identification information on viewers who have accessed the in-game context management server in a process of broadcasting the video game. The in-game context management server may extract a spectator participation attribute according to the identification information on the viewers.

In operation S10 (310), the in-game context management server may extract a spectator access situation attribute associated with the service operation of broadcasting the sports game video based on the spectator participation attribute according to the identification information on the viewers.

In operation S11 (311), the in-game context management server may extract a chat log from the relay server data 317. In operation S12 (312), the in-game context management server may extract a chat utterance attribute of a message according to the chat log.

In operation S13 (313), the in-game context management server may generate a chat event recognition model based on the spectator access situation attribute associated with the service operation and the chat utterance attribute of the message.

In operation S14 (314), the in-game context management server may generate a context-aware model which determines whether an important event occurs by using at least one of the in-game event recognition model, the utterance event recognition model, or the chat event recognition model.

Figure 4:
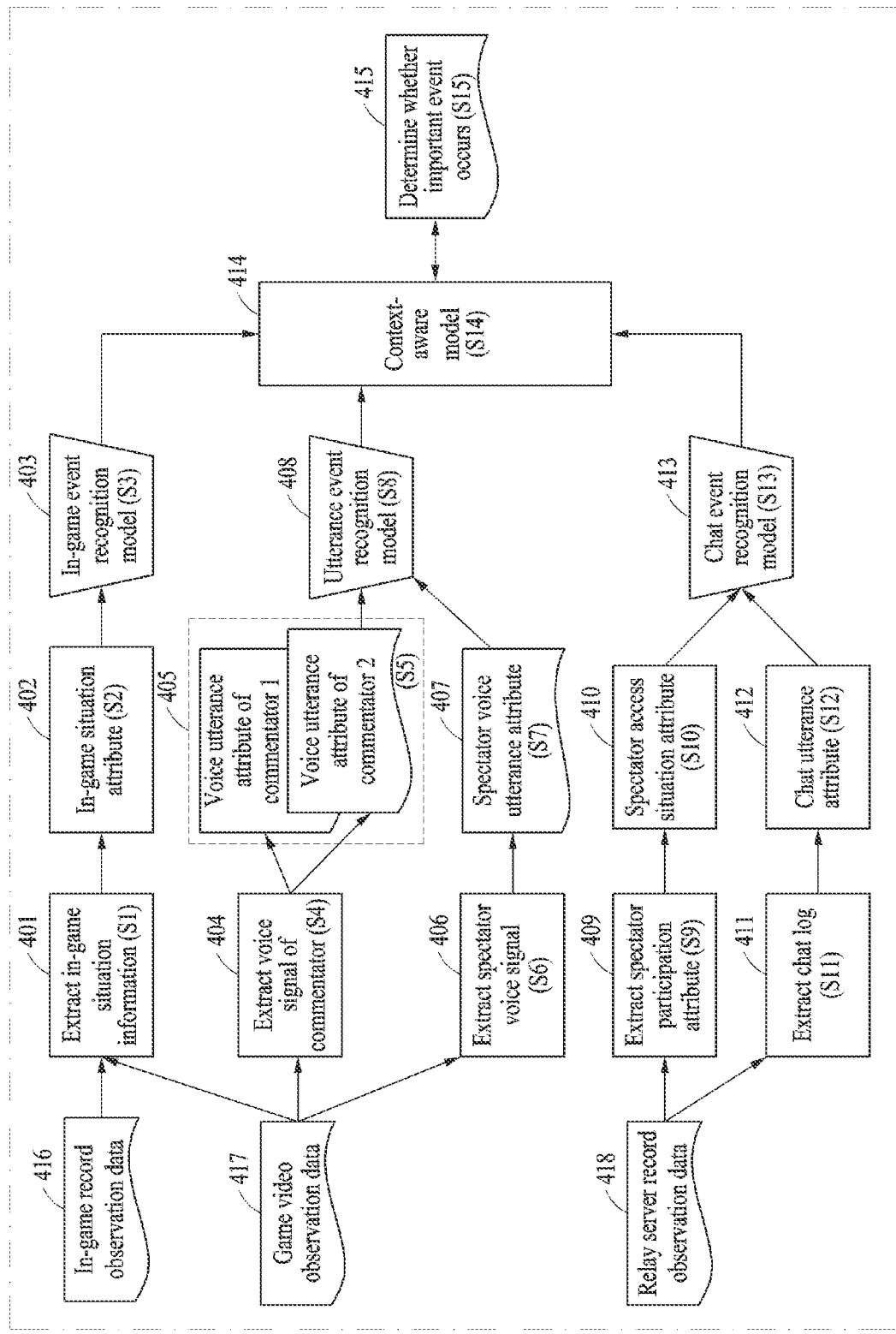
FIG. 4 is a flowchart illustrating an important event determining method according to an example embodiment.

FIG. 4 is a flowchart illustrating an important event determining method according to an example embodiment.

In operation S1 (401), the in-game context management server may collect in-game record observation data 416 and game video observation data 107 associated with a video game being broadcasted as a sports game video. The in-game context management server may extract in-game situation information based on the in-game record observation data 416 and the game video observation data 107.

In operation S2 (402), the in-game context management server may determine an in-game situation attribute for a game content by analyzing the in-game situation information.

In operation S3 (403), the in-game context management server may generate a first candidate event in the game content, which may be replayed, by applying the in-game situation attribute to the in-game event recognition model.

In operation S4 (404), the in-game context management server may extract a voice signal of a commentator who provides a running commentary of the sports game video by using game video observation data 417 recorded in a process of broadcasting the sports game video.

In operation S5 (405), the in-game context management server may classify the voice signals of the commentators based on the game video observation data 417 to determine voice utterance attributes of the commentators at each of the audible frequencies.

In operation S6 (406), the in-game context management server may extract a voice signal of a viewer who is watching the sports game video by analyzing the game video observation data 417.

In operation S7 (407), the in-game context management server may determine a voice utterance attribute of a viewer by analyzing the voice signal of the viewer.

In operation S8 (408), the in-game context management server may generate a second candidate event associated with the voice signal by applying the voice utterance attribute of the commentators and the voice utterance attribute of the viewer to an utterance event recognition model. The in-game context management server may determine voice utterance information, which may be replayed, in the sports game video according to the voice signal of the commentator and the voice signal of the viewer. The in-game context management server may determine a second candidate event based on the voice utterance information by the utterance event recognition model.

In operation S9 (409), the in-game context management server may extract identification information on viewers who have accessed the in-game context management server in a process of broadcasting the video game by using relay server record observation data 418 of the accessed viewers. The in-game context management server may extract a spectator participation attribute based on the identification information on the viewers.

In operation S10 (410), the in-game context management server may extract a spectator access situation attribute based on the spectator participation attribute.

In operation S11 (411), the in-game context management server may extract a chat log of the viewer, who has accessed the in-game context management server, based on the relay server record observation data 418.

In operation S12 (412), the in-game context management server may determine a chat utterance attribute based on the chat log of the viewer.

In operation S13 (413), the in-game context management server may determine a third candidate event by applying the spectator access situation attribute and the chat utterance attribute to the chat event recognition model.

In operation S14 (414), the in-game context management server may determine an important event of the video game by applying at least one of the first candidate event, the second candidate event, or the third candidate event to the context-aware model. The in-game context management server may apply at least one of the first candidate event, the second candidate event, or the third candidate event to the context-aware model.

In operation S15 (415), the in-game context management server may determine, as an important event, a candidate event including a duplicate game content among the candidate events by the context-aware model.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The implementations may be achieved as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single example embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In specific cases, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the disclosure, but are not intended to limit the scope of the disclosure. It will be apparent to those skilled in the art that various modifications based on the technical spirit of the present disclosure, as well as the disclosed example embodiments, can be made.

What is claimed is:

1. A context-aware model generating method performed by an in-game context management server, the context-aware model generating method comprising:
   determining in-game situation information on a game content by collecting in-game data, configured to be replayed, in a video game;
   determining voice utterance information by collecting game video data recorded in a process of broadcasting the video game as a sports game video;
   determining relay situation information by collecting relay server data of viewers who have accessed the in-game context management server; and
   generating a context-aware model which determines whether an important event occurs by using at least one of the in-game situation information, the voice utterance information, or the relay situation information,
   wherein the determining of the relay situation information comprises using the relay server data of viewers who have accessed the in-game context management server in conjunction with an utterance event recognition model.

2. The context-aware model generating method of claim 1, wherein the determining of the in-game situation information comprises:
   extracting in-game situation information on a specific action of a player by analyzing the in-game data and game video data for the video game;
   determining an in-game situation attribute for a game content by analyzing the in-game situation information; and
   determining the in-game situation information configured to be replayed, by applying the in-game situation attribute to an in-game event recognition model.

3. The context-aware model generating method of claim 2, wherein the extracting of the in-game situation information comprises:
   extracting the in-game situation information on the specific action of the player occurring at a certain time, based on a game content in which an input manipulation of the player is reflected in a process of the video game.

4. The context-aware model generating method of claim 1, wherein the determining of the voice utterance information comprises:
   extracting a voice signal of a commentator who provides a running commentary of the sports game video by analyzing the game video data;
   extracting a voice signal of a viewer who is watching the sports game video by analyzing the game video data; and
   determining the voice utterance information by applying the voice signal of the commentator and the voice signal of the viewer to an utterance event recognition model.

5. The context-aware model generating method of claim 4, wherein the extracting of the voice signal of the commentator comprises:
   determining game video data collected by a microphone connected to a relay broadcast camera based on the sports game video;
   classifying voice utterance attributes of each of a plurality of audible frequencies from the game video data; and extracting the voice signal of the commentator based on each of the classified voice utterance attribute.

6. The context-aware model generating method of claim 1, wherein the determining of the relay situation information comprises:
  extracting identification information on the viewers who have accessed the in-game context management server in a process of broadcasting the video game by analyzing the relay server data; and
  determining the relay situation information on access by applying the identification information on the viewers to the utterance event recognition model.

7. The context-aware model generating method of claim 6, wherein the determining of the relay situation information comprises:
  determining a spectator participation attribute for a service operation of broadcasting the sports game video based on the identification information on the viewers; and
  determining the relay situation information based on a message, by applying the spectator participation attribute to the utterance event recognition model.

8. The context-aware model generating method of claim 1, wherein the generating of the context-aware model comprises:
  determining candidate events in consideration of characteristics represented by each of the in-game situation information, the voice utterance information, and the relay situation information; and
  generating the context-aware model which determines a candidate event comprising a duplicate game content among the candidate events as a final important event.

9. An important event determining method comprising:
  determining a first candidate event associated with a game content by using in-game record observation data associated with a video game which is being broadcasted as a sports game video;
  determining a second candidate event associated with a voice signal by using game video observation data recorded in a process of broadcasting the video game as the sports game video;
  determining a third candidate event associated with a chat situation by using relay server record observation data of viewers who have accessed an in-game context management server; and
  determining an important event of the video game by applying at least one of the first candidate event, the second candidate event, or the third candidate event to a context-aware model,
  wherein the context-aware model is a model which is generated to determine whether an important event configured to be replayed occurs in the video game, by using at least one of the in-game record observation data, the game video observation data, or the relay server record observation data, and
  the determining of the third candidate event comprises using the relay server record observation data of viewers who have accessed the in-game context management server in conjunction with an utterance event recognition model.

10. The important event determining method of claim 9, wherein the determining of the first candidate event comprises:
  determining an in-game situation attribute for a game content by analyzing the in-game record observation data; and
  determining the first candidate event configured to be replayed in the game content according to the in-game situation attribute by an in-game event recognition model.

11. The important event determining method of claim 9, wherein the determining of the second candidate event comprises:
  extracting a voice signal of a commentator and a voice signal of a viewer from the game video observation data recorded at the same time in the process of broadcasting the video game as the sports game video;
  determining voice utterance information configured to be replayed in the sports game video according to the voice signal of the commentator and the voice signal of the viewer; and
  determining a second candidate event based on the voice utterance information by an utterance event recognition model.

12. The important event determining method of claim 11, wherein the extracting of the voice signals comprises:
  extracting the voice signal of the commentator and the voice signal of the viewer by classifying voice utterance attributes of each of a plurality of audible frequencies from the game video observation data.

13. The important event determining method of claim 9, wherein the determining of the third candidate event comprises:
  extracting identification information on viewers who have accessed the in-game context management server in the process of broadcasting the video game based on the relay server record observation data; and
  determining the third candidate event based on the identification information on the viewers by the utterance event recognition model.

14. The important event determining method of claim 13, wherein the determining of the third candidate event comprises:
  determining a spectator participation attribute associated with a service operation of broadcasting the sports game video based on the identification information on the viewers; and
  determining the third candidate event based on the spectator participation attribute by the utterance event recognition model.

15. The important event determining method of claim 9, wherein the determining of the important event comprises:
  applying at least one of the first candidate event, the second candidate event, or the third candidate event to the context-aware model; and
  determining a candidate event comprising a duplicate game content among the candidate events as an important event by the context-aware model.

16. An in-game context management server, comprising:
  a processor,
  wherein the processor is configured to:
  generate a context-aware model which determines whether an important event configured to be replayed occurs in a video game which is being broadcasted as a sports game video;
  determine candidate events from in-game context information, voice utterance information, and relay situation information associated with the video game by the context-aware model; and
  determine a candidate event comprising a duplicate game content among the candidate events as an important event, wherein the processor is further configured to determine the relay situation information using relay server data of viewers who have accessed the in-game context management server in conjunction with an utterance event recognition model.

17. The in-game context management server of claim 16, wherein the processor is configured to:
   determine the in-game situation information on a game content by collecting in-game data configured to be replayed in the video game;
   determine the voice utterance information by collecting utterance data recorded in a process of broadcasting the video game as the sports game video;
   determine the relay situation information by collecting chat data of the viewers who have accessed the in-game context management server; and
   generate the context-aware model which determines whether the important event occurs by using at least one of the in-game situation information, the voice utterance information, or the relay situation information.

18. The in-game context management server of claim 17, wherein the processor is configured to:
   determine a first candidate event according to the game content by using in-game data for the video game which is being broadcasted as the sports game video;
   determine a second candidate event according to voice utterance information using utterance data recorded in a process of broadcasting the video game as the sports game video; and
   determine a third candidate event according to the relay situation information by using the chat data of viewers who have accessed the in-game context management server.

19. The in-game context management server of claim 18, wherein the processor is configured to:
   determine, as an important event, a candidate event comprising a duplicate game content among the candidate events by applying at least one of the first candidate event, the second candidate event, or the third candidate event to the context-aware model.

* * * * *